United States Patent [19]

Harris

[11] Patent Number: 4,993,483

[45] Date of Patent: Feb. 19, 1991

[54] GEOTHERMAL HEAT TRANSFER SYSTEM

[76] Inventor: Charles Harris, 5314 W. Luke, Glendale, Ariz. 85301

[21] Appl. No.: 468,166

[22] Filed: Jan. 22, 1990

[51] Int. Cl.⁵ .......................... F25B 27/00; F24J 3/08
[52] U.S. Cl. ..................................... 165/45; 62/238.7; 62/260; 165/104.31; 165/104.11
[58] Field of Search ............... 165/45, 104.31, 104.11; 62/238.6, 238.7, 260

[56] References Cited

U.S. PATENT DOCUMENTS

| | | | |
|---|---|---|---|
| 4,255,936 | 3/1981 | Cochran | 62/238.7 |
| 4,277,946 | 7/1981 | Bottum | 62/260 |
| 4,299,277 | 11/1981 | McGregor | 62/260 |
| 4,412,426 | 11/1983 | Yuan | 62/260 |
| 4,516,629 | 5/1985 | Bingham | 62/260 |
| 4,566,532 | 1/1986 | Basmajian | 165/45 |
| 4,741,388 | 5/1988 | Kuroiwa | 62/260 |

FOREIGN PATENT DOCUMENTS 119120 9/1979 Japan ..................................... 62/260

Primary Examiner—Albert W. Davis, Jr.
Attorney, Agent, or Firm—Tod R. Nissle

[57] ABSTRACT

A geothermal system for conditioning air in an enclosed space by transferring heat between the air and a heat exchange liquid which is circulated through a line buried in the earth. The line transfers heat between the earth and the heat exchange liquid circulating through the line. The line is constructed to facilitate the expansion and contraction of the line with changes in temperature and to facilitate the transfer of heat between heat exchange liquid in the line and the earth without causing ice to form around the line.

2 Claims, 1 Drawing Sheet

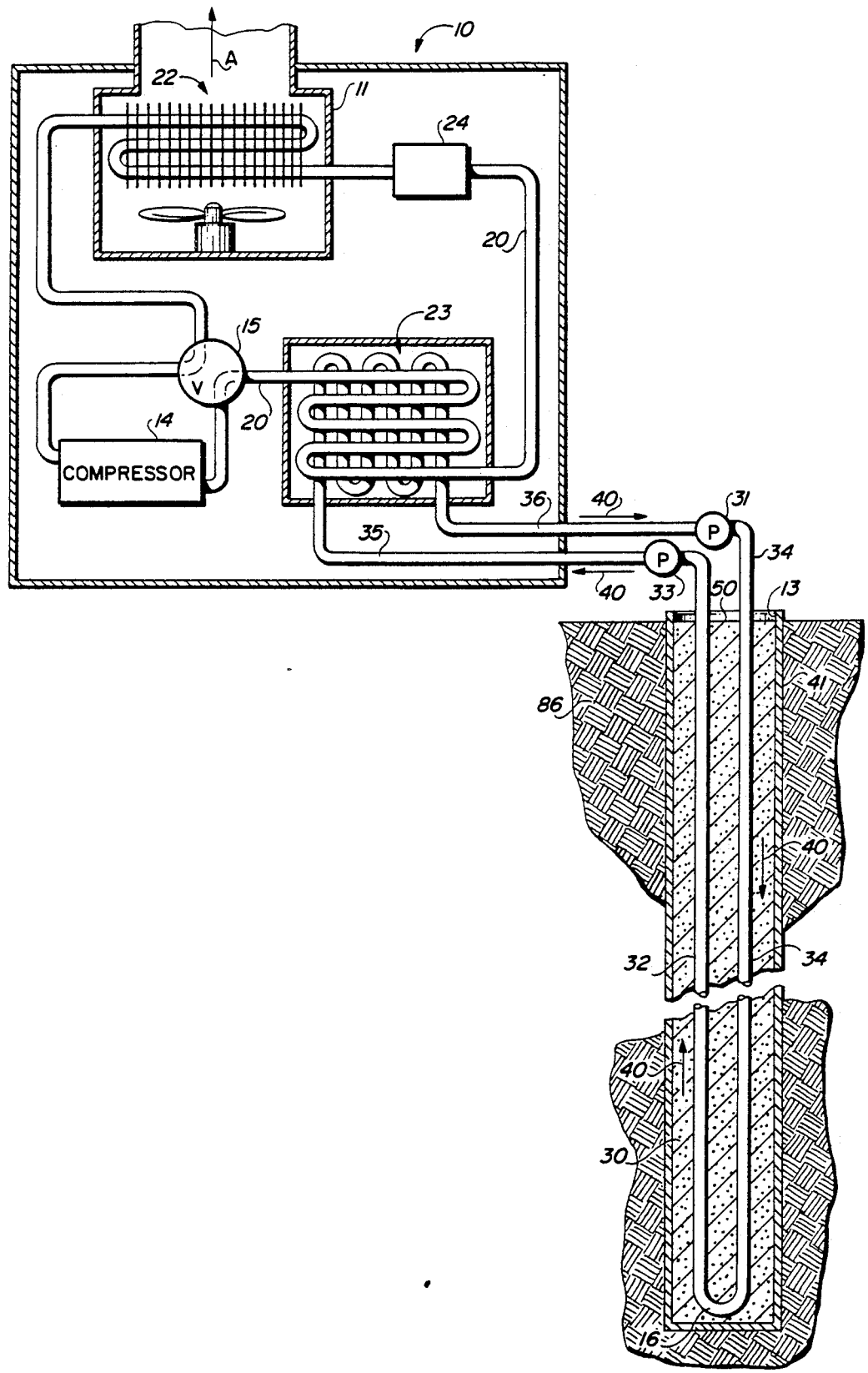

GEOTHERMAL HEAT TRANSFER SYSTEM

This invention relates to systems for transferring heat between a fluid and the earth.

More particularly, the invention relates to a geothermal system for conditioning air in an enclosed space by transferring heat between the air and the earth.

In another respect, the invention relates to a geothermal system for conditioning air in an enclosed space by transferring heat between the air and a heat exchange liquid which is circulated through a line buried in the earth to transfer heat between the earth and heat exchange liquid in the line, the line being constructed to facilitate the expansion and contraction of the line with changes in temperature and to facilitate the transfer of heat between heat exchange liquid in the line and the earth without causing ice to form around the line.

Systems for recovering geothermal energy are well known. See, for example, U.S. Pat. Nos. 4,644,750 to Lockett et al. and 4,286,651 to Steiger et al. Such systems often attempt to facilitate the heat transfer between the earth and a tube inserted in the earth by moistening soil around the tube. See, for example, U.S. Pat. Nos. 4,325,228 to Wolf, 4,392,531 to Ippolito, and 4,255,936 to Cochran. Common problems associated with such systems are that the water around a tube tends to freeze and that the tube, over time, tends to weaken, crack and eventually rupture due to contraction and expansion of the tube with changes in temperature.

Accordingly, it would be highly desirable to provide an improved geothermal system for conditioning air in an enclosed space by transferring heat between the air and the earth, the system transferring heat to or from the earth through a tube which extends into the earth.

It would also be highly desirable to provide an improved geothermal air conditioning system of the type described which would minimize the likelihood that the tube extending into the earth would rupture due to contraction and expansion of the tube with changes in temperature.

Therefore, it is a principal object of the invention to provide an improved geothermal system for conditioning air or other fluids.

Another object of the invention is to provide an improved geothermal system for conditioning air in an enclosed space by transferring heat between the air and a heat transfer fluid which is circulated through a line buried in the earth to transfer heat between the earth and the heat transfer fluid in the line.

A further object of the invention is to provide an improved geothermal air conditioning system of the type described in which expansion and contraction of the buried line with changes in temperature in the earth or in the heat transfer fluid in the line is compensated for to minimize damage or injury to the line which can occur as the result of such expansion and contraction.

These and other, further and more specific objects and advantages of the invention will be apparent to those skilled in the art from the following detailed description thereof, taken in conjunction with the drawing which illustrates a geothermal heat transfer system constructed in accordance with the principles of the invention.

Briefly, in accordance with my invention, I provide an improved geothermal system for conditioning air in an enclosed space by the transfer of heat between the air and the earth. The geothermal system includes a heat pump; an air circulation system for circulating air through the heat pump in heat exchange relationship with a refrigerant therein and for directing the air into the enclosed space; a heat sink in heat exchange relationship with the earth; and, a liquid circulating system for circulating a heat exchange liquid through the heat pump in heat exchange relationship with said refrigerant and circulating said heat exchange liquid through the heat sink. The improvement in the geothermal system comprises an improved heat sink comprising an elongate container of slurry extending into the earth, the slurry including a liquid antifreeze solution and a plurality of particles shaped and dimensioned such that the particles move over one another without interlocking and packing when the container contracts; a first line extending into the container and through the slurry and spaced away from the inner wall of the container, the line having a first end and a second end; a second line extending into the container and through the slurry and spaced away from the inner wall of the container, the second line having a first end and a second end; means connecting the first end of the first line and the second end of the second line to the liquid circulating system such that liquid circulates in a closed circuit from the heat pump through one of the pair comprising the first line and the second line, through the other of said pair comprising the first line and the second line, and back to the heat pump; and, means connecting the first and second lines such that the heat exchange liquid flows between the first and second lines without intermixing with the slurry.

In another embodiment of my invention I provide an improved geothermal system for conditioning a primary fluid by the transfer of heat between the fluid and the earth, the geothermal system including a reservoir of the primary fluid; a heat sink in heat exchange relationship with the earth; and a fluid circulating system for circulating a heat exchange fluid past the reservoir in heat exchange relationship with the primary fluid and circulating the heat exchange fluid through the heat sink. The improvement in the geothermal system comprises an improved heat sink. The improved heat sink includes an elongate container of slurry extending into the earth, the container having an inner wall, the slurry including a liquid antifreeze solution and a plurality of particles shaped and dimensioned such that the particles move over one another and permit the container to contract without the particles interlocking and packing; a first end extending into the container and through the slurry and spaced away from the inner wall of the container, the line having a first end and a second end; a second line extending into the container and through the slurry and spaced away from the inner wall of the container, the second line having a first and second end; means connecting the first end of the first line and the second end of the second line to the fluid circulating system such that the heat exchange fluid circulates in a closed circuit past the reservoir through one of the pair comprising the first line and the second line, through the other of said pair comprising the first line and the second line, and back past the reservoir; and, means connecting the first and second lines such that the heat exchange fluid flows between the first and second lines without intermixing with the slurry.

Turning now to the drawings, which depict the presently preferred embodiments of the invention for the purpose of illustrating the practice thereof and not by way of limitation of the scope of the invention, and in which like reference characters refer to corresponding elements throughout the several views, FIG. 1 illustrates a geothermal heating and cooling system constructed in accordance with the principles of the invention and including a conventional liquid-to-air heat pump 10. Heat pump 10 includes a duct 11, heat transfer fins 22 and fan 12. Fan 12 directs air over fins 22 and through duct 11 into the enclosed space to be heated and cooled, such as the interior of a residence, office, or manufacturing facility. Heat pump 10 also includes compressor 14 which is provided with a two-way reversible valve 15 for selectively directing refrigerant through lines 20 of a closed circuit which interconnects heat transfer fins 22, heat exchanger 23, and expansion valve 24.

In FIG. 1, it is assumed that reversible valve 15 is positioned for heating air directed through duct 11 by fan 12. Vaporized refrigerant fluid is compressed by compressor 14 to raise the temperature of the fluid. The heated, compressed fluid is delivered to heat exchanger fins 22, which function as a condenser. Fan 12 moves air over the heat exchanger fins 22 in the direction of arrow A. Air moving over fins 22 is heated by heat given up by the compressed refrigerant vapor which cools and liquifies while passing through fins 22. The liquefied cooled refrigerant then flows through expansion valve 24 into the heat exchange coils of heat exchanger 23, which is operating as an evaporator. The drop in pressure of the cooled, liquefied refrigerant passing through expansion valve 24 and the absorption of heat in the heat exchanger 23 causes the liquefied refrigerant to undergo an increase in temperature and evaporate as it passes through the heat exchanger 23. After leaving the heat exchanger 23, the vaporized refrigerant is returned to the input side of the compressor 14 to continue the cycle. The heat of evaporation absorbed by the refrigerant flowing through the heat exchanger 23 is provided by heat exchange fluid flowing through conduits 32, 34, 35, 36 in the direction indicated by arrows 40 in FIG. 1.

When the heat pump of FIG. 1 is used for cooling the air directed through duct 11 by fan 12, the selector valve 15 is rotated or adjusted to reverse the direction of flow of the refrigerant through the connecting lines 20. When the valve 15 is in this new adjusted position, the compressor 14 delivers the compressed vaporized refrigerant fluid, the temperature of which is raised by compression, to the coils of the heat exchanger 23. Heat exchanger 23 now operates as a condenser and the compressed heated refrigerant vapor gives up heat, is reduced in temperature, and is liquefied. The liquefied and cooled refrigerant then passes through the expansion valve 24 and refrigerant is evaporated as it passes through the heat exchange fins 22. Fins 22 now operate as an evaporator. The evaporated refrigerant absorbs heat from air moved over the fins 22 by fan 12. The vaporized refrigerant fluid then moves back to the input side of the compressor 14 to complete a full cooling cycle and has approximately returned to its original low temperature and pressure as it enters the input side of the compressor 14 to continue the air cooling heat exchange cycle.

The components of the heat pump 10 described above are conventional and although a particular type of heat pump has been described, it is understood that the heating or cooling provided by the heat exchange liquid in lines 32, 34, 35, 36 can be utilized in any type of liquid-to-air heat pump or can be utilized in any type of fluid heating or cooling system.

A closed circuit liquid circulating system is provided for circulating heat exchange fluid (in heat exchange relationship with the refrigerant) through the heat pump 10 and a heat sink in heat exchange relationship with the earth. The heat exchange fluid circulating system includes lines 35 and 36 with circulating pumps 31 and 33 integrally disposed in the lines 36 and 35, respectively. One end of the line 35 is connected to one side of the heat exchanger 23 and the other end of line 35 is connected to line 32. One end of line 36 is connected to the other side of the heat exchanger 23, and the other end of line 36 is connected to line 34.

The heat sink includes an elongate cylindrical tube 41 which houses lines 32, 34 and houses sand 30 which fills tube 41 from the bottom 16 to the top 13 of the tube. Sand 30 contacts line 32 and is intermediate lines 32, 34 and the inner cylindrical wall of tube 41. Tube 41 is also filled with a liquid antifreeze such as salt water or glycol. The antifreeze permeates the interstitial areas intermediate the sand particles and preferably has a freezing temperature lower than the lowest operating temperature of the heat exchange fluid flowing through lines 32, 34. Tube 41 presently is copper, has an outer diameter of two inches, and houses lines 32, 34 each having an outer diameter of three-eighths of an inch. A thirty foot length of two inch diameter tube generates approximately 10,000 to 12,000 BTU per hour, depending on the flow rate of heat exchange fluid through lines 32 and 34. The sand particles 30 are of uniform size or are sized such that the sand will not pack during the expansion and contraction of tube 41 and line 32. Sand 30 also provides a thermal barrier which is believed to help prevent the tube 41 from freezing. The glycol or other fluid antifreeze in tube 41 permits the liquid traveling through lines 32 to 34 to have a very cold temperature so that the fluid in lines 32, 34 gather heat even when the ground 86 is cold.

The sand, like a slab of concrete, stores a substantial amount of heat. It is, as noted, believed that this heat tends to minimize the likelihood that conduit 11 will freeze and that a layer of ice will form around tube 41. The antifreeze in tube 41 also helps insulate the tube 41 from the fluid in lines 32, 34. The heat retained by the sand also tends to prevent the rapid expansion and contraction of tube 41 and lines 32, 34 due to changes in temperature. Reducing the rate of contraction of lines 32, 34 and tube 41 extends the useful life of the system. Minimizing the likelihood that ice will form on tube 41 or on lines 32, 34 is also important because ice interferes with the flow of heat from the ground 86 through conduit 41 and into lines 32, 34. Lines 32, 34 are presently fabricated from copper. The antifreeze in tube 41 prevents ice from forming on lines 32, 34. Lines 32, 34 and tube 41 can be fabricated from any desired thermally conductive material.

The geothermal heat transfer system of the invention operates effectively regardless of whether the earth surrounding the tube 41 is moist. The sand—antifreeze slurry in tube 41 permits the fluid flowing through lines 32, 34 to be very cold so that the fluid, preferably freon, absorbs heat from the ground even when the ground is very cold. Further, the sand—antifreeze slurry minimizes the likelihood that tube 41 or lines 32, 34 will be damaged due to contraction and expansion of the lines and minimizes the likelihood that ice will form around lines 32, 34 or tube 41.

The sand particles in the slurry are, as earlier noted, presently preferably each of uniform shape and dimension so that the sand will not pack and will permit the tube 41 and lines 32, 34 to freely expand and contract in size. If the sand particles are sized such that the sand packs and interferes with the contraction and expansion of lines 32, 34 and tube 41, this promotes damage to and the eventual cracking or rupture of tube 41 and/or lines 32, 34. Accordingly, an aggregate of different sized particles normally is not acceptable in the practice of the invention. Gravel aggregates of the type used to produce concrete are not acceptable in the invention because such aggregates normally include particles of differing size which pack or interlock to strengthen concrete formed with the aggregate. The sand particles 30 in the sand—antifreeze slurry can take on any shape and dimension as long as the sand does not pack and will move and be displaced as the tube 41 and lines 32, 34 contract and expand with changes in temperature. In FIG. 1, the upper end 13 of the tube 41 is open. This permits the level of the top surface 50 of the slurry to rise and fall with the expansion and contraction of tube and lines 32, 34. The top of tube 41 can be sealed. When tube 41 is sealed it is desirable to leave some additional space at the top of tube 41 which permits the sand particles 30 to move upwardly when tube 41 contracts.

The antifreeze utilized in the sand—antifreeze slurry in tube 41 preferably has a freezing point below the lowest operating temperature of the fluid, be it liquid or gas or a solid—liquid or solid—gas slurry, flowing through lines 32, 34. In the practice of the invention it is important that the sand—antifreeze slurry does not freeze because when the slurry freezes, it interferes with heat transfer between lines 32, 34 and the earth 86.

In the drawings, the upper or first end of the line 32 is connected to line 35. The second or lower end of line 32 is connected to the lower or first end of line 34. The upper or second end of line 34 is connected to line 36. Lines 32 and 43 permit the heat exchange fluid flowing through lines 32 and 34 to pass through the sand—antifreeze slurry in tube 41 without contacting the slurry. Any other desired configuration of lines 32 and 34 can be utilized as long as the heat exchange fluid flowing through the lines 32, 34 does not contact the slurry in tube 41. For example, the concentric tube arrangement illustrated in Cochran U.S. Pat. No. 4,255,936 can be utilized.

One of the important functions of the sand or silica particles 30 is acting as a heat sink which tends to thermally stabilize tube 41. The density of sand particles 30 is approximately 2.66 grams per cubic centimeter, which density is over 200% greater than the density of water or of most aqueous solutions. Consequently, particles of materials other than sand can be utilized as long as they have a density equal to or greater than 2.0 grams per cubic centimeter. The thermal conductivity of the sand is in the range of 0.017 to 0.0325 gram-calories/-(second) (square centimeter) (°C./centimeter), or is, for sake of simplicity, in the range of 0.017 to 0.0325 lambda, where lambda is equivalent to g.-cal./(sec.) (sq. cm.) (°C./cm.). The thermal conductivity of copper is 0.920 lambda (0° C.); of aluminum is 0.461 lambda (0° C.); of nickel (99%) is 14.0 lambda (18° C.); of concrete is 0.0022 lambda (20° C.); of crown glass is 0.00163 lambda (12.5° C.); of graphite is 0.1055 lambda (50° C.); of rock salt is 0.01667 lambda (0° C.); of sylvite is 0.01665 lambda (0° C.); of lead is 0.0827 lambda (18° C.); of ethyl alcohol is 0.000487 lambda (0° C.); water is 0.00129 lambda (4° C.); of ethylene glycol is 0.0006353 lambda (0° C.); of tin is 0.1528 lambda (0° C.); and, of 60 CU+40 Ni is 0.054 lambda (18° C.). Consequently, when the slurry in tube or container 41 is comprised of sand particles 30 and glycol antifreeze 60, the glycol is a thermal insulator while the silica sand particles are, in comparison to the glycol, thermally conductive. Yet the sand particles 30 add a thermal stability to the slurry because particles 30 are not at all as conductive as copper, where copper is typically used to fabricate tube 41 and lines 32 and 34. In the practice of the invention, the thermal conductivity of particles 30 is therefore in the range of 10 to 150 lambda, and preferably is in the range of 10 to 60 lambda. Consequently, 99% nickel, which has a specific gravity at 20° C. of 8.90 g/cc and a lambda of 14.0, would, for example, be an acceptable substitute for the presently preferred silica sand particles.

Having described my invention in such terms as to enable those skilled in the art to understand and practise it, and having identified the presently preferred embodiments thereof, I claim:

1. In a geothermal system for conditioning air in a enclosed space by the transfer of heat between the air and the earth, said system including
    a heat pump,
    an air circulation system for circulating air through the heat pump in heat exchange relationship with a refrigerant therein and for directing the air into the enclosed space,
    a heat sink in heat exchange relationship with the earth, and
    a liquid circulating system for circulating a heat exchange liquid through the heat pump in heat exchange relationship with said refrigerant and circulating said heat exchange liquid through said heat sink,
the improvement in said system wherein said heat sink comprises
    (a) an elongate imperforate container of slurry extending into the earth, said container having an inner wall, said slurry including
        (i) a liquid antifreeze solution, and
        (ii) a plurality of particles shaped and dimensioned such that said particles move over one another without interlocking and packing when said container contracts;
    (b) a first line extending into said container and through said slurry and spaced away from said inner wall of said container, said line having a first end and a second end;
    (c) a second line extending into said container and through said slurry and spaced away from said inner wall of said container, said second line having a first end and a second end;
    (d) means connecting said first end of said first line and said second end of said second line to said liquid circulating system such that liquid circulates in a closed circuit from said heat pump
        (i) through one of the pair comprising
            said first line, and
            said second line,
        (ii) through the other of said pair comprising
            said first line, and
            said second line, and
        (iii) back to said heat pump, and
    (e) means connecting said first and second lines such that said heat exchange liquid flows between said first and second lines without intermixing with said slurry.

2. In a system for conditioning a primary fluid by the transfer of heat between the fluid and the earth, said system including
- a reservoir of said primary fluid,
- a heat sink in heat exchange relationship with the earth,
- a fluid circulating system for circulating a heat exchange fluid past said reservoir in heat exchange relationship with said primary fluid and circulating said heat exchange fluid through said heat sink, the improvement in said system wherein said heat sink comprises
- (a) an elongate imperforate container of slurry extending into the earth, said slurry including
  - (i) a liquid antifreeze solution, and
  - (ii) a plurality of particles shaped and dimensioned such that said particles move over one another and permit said container to contract without said particles interlocking and packing; and,
- (b) a first line extending into said container and through said slurry and spaced away from said inner wall of said container, said line having a first end and a second end;
- (c) a second line extending into said container and through said slurry and spaced away from said inner wall of said container, said second line having a first end and a second end;
- (d) means connecting said first end of said first line and said second end of said second line to said fluid circulating system such that said heat exchange fluid circulates in a closed circuit past said reservoir
  - (i) through one of the pair comprising
    - said first line, and
    - said second line,
  - (ii) through the other of said pair comprising
    - said first line, and
    - said second line, and
  - (iii) back past said reservoir; and,
- (e) means connecting said first and second lines such that said heat exchange fluid flows between said first and second lines without intermixing with said slurry.

* * * * *